(12) United States Patent
Wang et al.

(10) Patent No.: US 12,299,070 B2
(45) Date of Patent: May 13, 2025

(54) METHOD, ELECTRONIC DEVICE, AND COMPUTER PROGRAM PRODUCT FOR EVALUATING IN AN EDGE DEVICE SAMPLES CAPTURED BY A SENSOR OF A TERMINAL DEVICE

(71) Applicant: Dell Products L.P., Round Rock, TX (US)

(72) Inventors: Zijia Wang, WeiFang (CN); Jiacheng Ni, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 493 days.

(21) Appl. No.: 17/745,462

(22) Filed: May 16, 2022

(65) Prior Publication Data
US 2023/0342422 A1    Oct. 26, 2023

(30) Foreign Application Priority Data
Apr. 22, 2022  (CN) .......................... 202210431261.3

(51) Int. Cl.
*G06F 18/21*     (2023.01)
*G06F 18/241*    (2023.01)

(52) U.S. Cl.
CPC ............ *G06F 18/21* (2023.01); *G06F 18/241* (2023.01); *G06F 2218/12* (2023.01)

(58) Field of Classification Search
None
See application file for complete search history.

(56) References Cited

U.S. PATENT DOCUMENTS 11,514,463 B2 *  11/2022  Monassebian .........  G06Q 20/22
12,045,844 B2 *   7/2024  Monassebian .........  G06Q 10/02
(Continued)

FOREIGN PATENT DOCUMENTS

EP        3422262 A1 *   1/2019

OTHER PUBLICATIONS

Jordaney, Cavallaro et al., Google transcription of EP3422262A1, Originally filed on Jun. 30, 2017, Available online at Google Patents, https://patents.google.com/patent/EP3422262A1/en?oq=EP3422262A1 (Year: 2017).*

(Continued)

*Primary Examiner* — Tahmina N Ansari
(74) *Attorney, Agent, or Firm* — Ryan, Mason & Lewis, LLP

(57) ABSTRACT

Embodiments of the present disclosure provide a method, an electronic device, and a computer program product for evaluating samples. The method includes receiving, at an edge device, a classification model from a cloud server. The method further includes acquiring a sample distribution corresponding to each class in a plurality of classes of the classification model. The method further includes acquiring an input sample which is marked as a first class in the plurality of classes. The method further includes determining whether the input sample conforms to a first sample distribution corresponding to the first class. The method further includes identifying, in response to the input sample conforming to the first sample distribution, the input sample as a trusted sample. The trusted sample indicates that the input sample is correctly marked. By the method, a noise sample with a wrong label can be recognized, thus avoiding model degradation during update.

20 Claims, 6 Drawing Sheets

(56) References Cited

U.S. PATENT DOCUMENTS 12,141,943 B2 * 11/2024 Dai .......................... G06T 7/10
2022/0076282 A1 * 3/2022 Monassebian ........ G07F 17/246
2024/0202871 A1 * 6/2024 Dai ...................... G06T 3/4053

OTHER PUBLICATIONS

T. Wang et al., "Dataset Distillation," arXiv: 1811.10959v3, Feb. 24, 2020, 14 pages.
Y. Lecun et al., "GradientBased Learning Applied to Document Recognition," Proceedings of the IEEE, vol. 86, No. 11, Nov. 1998, pp. 2278-2324.
G. Hinton et al., "Distilling the Knowledge in a Neural Network," arXiv:1503.02531v1, Mar. 9, 2015, 9 pages.
E. Strubell et al., "Energy and Policy Considerations for Deep Learning in NLP," arXiv:1906.02243v1, Jun. 5, 2019, 6 pages.
C. Zhang et al., "Understanding Deep Learning Requires Rethinking Generalization," arXiv:1611.03530v2, Feb. 26, 2017, 15 pages.
The Linux Foundation, "Pravega Concepts," https://cncf.pravega.io/docs/nightly/pravega-concepts/, Accessed Feb. 6, 2022, 12 pages.
U.S. Appl. No. 17/666,736, filed in the name of Zijia Wang et al. on Feb. 8, 2022, and entitled "Method, Electronic Device, and Computer Program Product for Managing Training Data.".

* cited by examiner

METHOD, ELECTRONIC DEVICE, AND COMPUTER PROGRAM PRODUCT FOR EVALUATING IN AN EDGE DEVICE SAMPLES CAPTURED BY A SENSOR OF A TERMINAL DEVICE

RELATED APPLICATION(S)

The present application claims priority to Chinese Patent Application No. 202210431261.3, filed Apr. 22, 2022, and entitled "Method, Electronic Device, and Computer Program Product for Evaluating Samples," which is incorporated by reference herein in its entirety.

FIELD

Embodiments of the present disclosure relate to the field of computers, and more particularly, to a method, an electronic device, and a computer program product for evaluating samples.

BACKGROUND

Edge computing architecture usually includes a cloud server, an edge server, and a terminal device. In order to enable the edge server to quickly respond to service requirements of the terminal device, some machine learning models for specific services are sent from the cloud server to the edge server. In this way, the terminal device can use a corresponding machine learning model for deduction.

During operation, the terminal device will continuously acquire new samples. At this moment, the model needs to be updated, which is a common problem when applying a deep neural network (DNN), for example. At this moment, model retraining or model fine adjustment is usually used to update the DNN. For example, in order to retrain the model, supervised learning can be used to train the model. Therefore, it is also necessary to acquire labels of the new samples. However, in some cases, obtained labels are inaccurate, and such labels can be referred to as noisy labels. Using samples with the noisy labels to train the model will lead to the degradation of the model.

SUMMARY

Embodiments of the present disclosure provide a solution for evaluating an acquired new sample at an edge device.

In a first aspect of the present disclosure, a method for evaluating samples is provided. The method includes receiving, at an edge device, a classification model from a cloud server. The method further includes acquiring a sample distribution corresponding to each class in a plurality of classes of the classification model. The method further includes acquiring an input sample which is marked as a first class in the plurality of classes. The method further includes determining whether the input sample conforms to a first sample distribution corresponding to the first class. Finally, the method includes identifying, in response to the input sample conforming to the first sample distribution, the input sample as a trusted sample. The trusted sample here indicates that the input sample is correctly marked.

In a second aspect of the present disclosure, an electronic device is provided. The electronic device includes a processor; and a memory coupled to the processor. The memory has instructions stored therein, and the instructions, when executed by the processor, cause the device to execute actions. The actions include receiving, at an edge device, a classification model from a cloud server. The actions further include acquiring a sample distribution corresponding to each class in a plurality of classes of the classification model. The action further include acquiring an input sample which is marked as a first class in the plurality of classes. The actions further include determining whether the input sample conforms to a first sample distribution corresponding to the first class. Finally, the actions further include identifying, in response to the input sample conforming to the first sample distribution, the input sample as a trusted sample, the trusted sample indicating that the input sample is correctly marked.

In a third aspect of the present disclosure, a computer program product is provided. The computer program product is tangibly stored on a non-transitory computer-readable medium and includes machine-executable instructions. The machine-executable instructions, when executed by a machine, cause the machine to perform the method according to the first aspect.

This Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

By more detailed description of example embodiments of the present disclosure, provided herein with reference to the accompanying drawings, the above and other objectives, features, and advantages of the present disclosure will become more apparent, where identical reference numerals generally represent identical components in the example embodiments of the present disclosure. In the accompanying drawings.

DETAILED DESCRIPTION

Principles of the present disclosure will be described below with reference to several example embodiments illustrated in the accompanying drawings. Although the drawings show example embodiments of the present disclosure, it should be understood that these embodiments are merely described to enable those skilled in the art to better understand and further implement the present disclosure, and not to limit the scope of the present disclosure in any way.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

Figure 1:
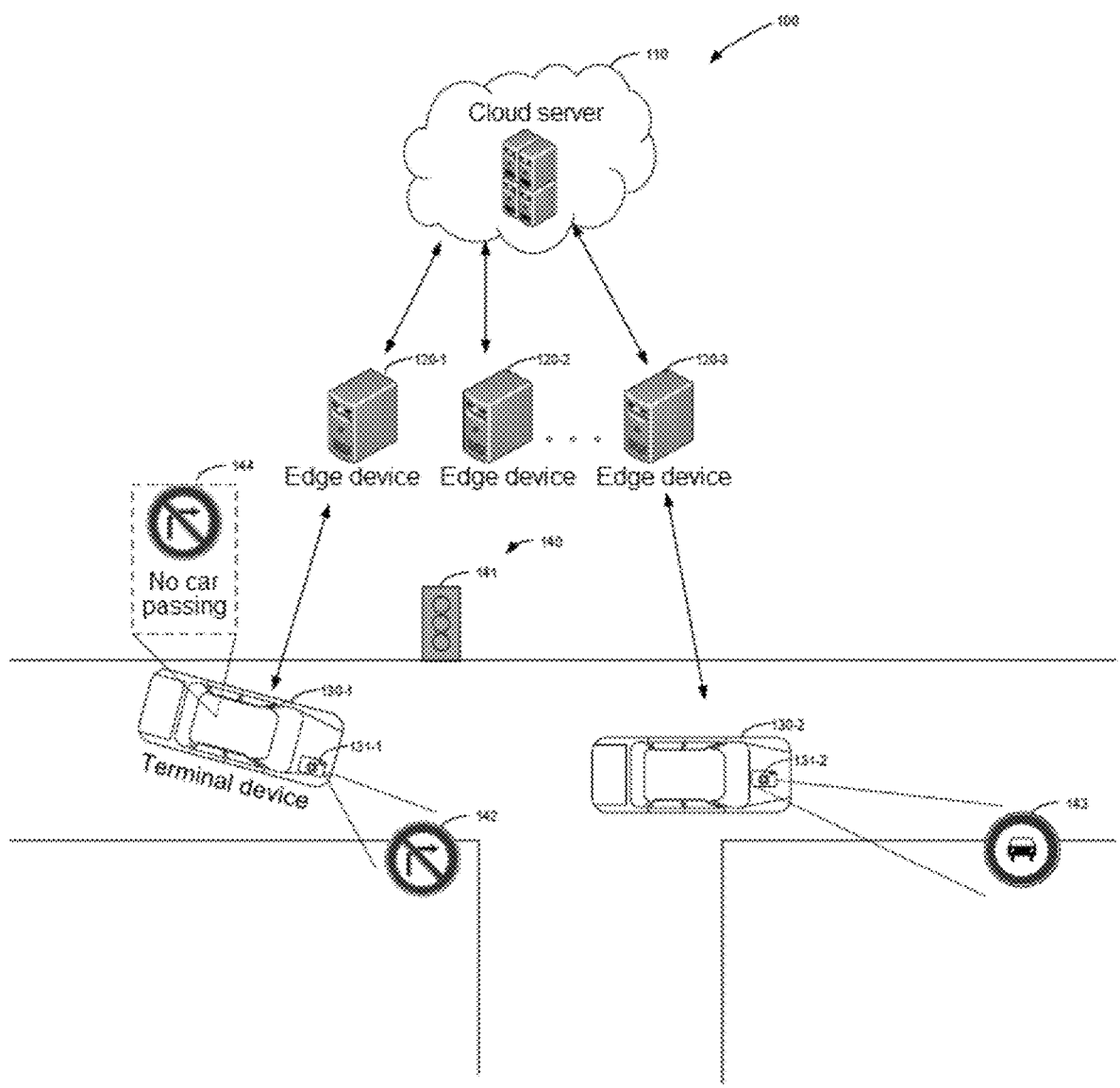
FIG. 1 shows a schematic diagram of a cloud/edge system in which an embodiment of the present disclosure can be implemented.

FIG. 1 shows a schematic diagram of cloud/edge system 100 in which an embodiment of the present disclosure can be implemented. As shown in FIG. 1, cloud/edge system 100 can include a cloud layer, an edge layer, and a terminal device layer. The cloud layer may include cloud server 110. Cloud server 110 can include one or more cloud computing devices, and these computing devices usually have abundant computing resources and storage resources and can perform complex computing tasks. As a processing center, for example, a cloud server is a computing center of a cloud/edge architecture, and a computing result or other data of an edge device can be permanently stored by the cloud server. An analysis task with high importance is usually completed by the operation of the cloud server. At the same time, the cloud server may further perform policy distribution and management on the edge device. The edge layer may include one or more edge computing devices 120-1, 120-2, 120-3 (collectively or individually referred to as edge device 120), and these edge devices 120 usually only have limited computing resources and storage resources and cannot perform complex computing tasks. The terminal device layer may include one or more terminal devices 130, such as mobile terminals, cameras, and vehicles with cameras, and these terminal devices 130 may collect sample data and perform simple computing tasks. In the embodiment shown in FIG. 1, terminal device 130-1 and terminal device 130-2 (collectively or individually referred to as terminal device 130) are both vehicles traveling on a road. For example, both of terminal device 130-1 and terminal device 130-2 are configured with image capture devices 131-1, 131-2 configured to collect an image of the environment where they are located. Terminal device 130 is composed of various Internet of things (IoT) data collection devices and mainly carries out data collection, and its data computing capability is not considered. For example, terminal device 130 can direct data to the edge device 120 or the cloud server 110 as a carrier in the form of input.

In the embodiment shown in FIG. 1, terminal device 130 is, for example, an autonomous vehicle or an assisted driving vehicle. In order to enable terminal device 130 to make an action that is in line with mark 140 when detecting mark 140, terminal device 130 uses a computing resource at edge device 120 for deduction, so as to identify mark 140. In order to provide a computing service, a classification model used for classifying a mark to identify a detected mark, for example, is deployed at edge device 120. The classification model may be obtained by training at cloud server 110 on the basis of a full sample set with an extremely large number of samples.

As shown in FIG. 1, there are terminal devices 130-1 and 130-2 traveling on a road. Terminal device 130-2 is located in front of terminal device 130-1 in the road, and detects no-car-passing sign 143. At the same time, terminal device 130-1 travels to a T-shaped intersection, and detects traffic light sign 141 on the left side of the road and no-right-turn sign 142 on the right side of the road. Traffic light sign 141 is a red light, for example, indicating that traffic is temporarily prohibited. At this moment, since a class to which no-right-turn sign 142 belongs does not exist in an initial sample set, terminal device 130-1 cannot determine its class by using a classification model at edge device 120-1 that is in communication connection with the terminal device. Therefore, terminal device 130-1 determines that no-right-turn sign 142 cannot be identified and has no idea where to go. Terminal device 130-1 can ask for human intervention, for example, to request manual control over terminal device 130-1. However, for various reasons, terminal device 130-1 may receive a wrong manual control "turn right" and start to make a right turn. At this moment, terminal device 130-1 incorrectly determines "no-car-passing sign" corresponding to the sign 143 as a label of no-right-turn sign 142 on the basis of the manual control "turn right." Therefore, noise sample 144 with a noise label is generated. Then, noise sample 144 will be sent to edge device 120-1 as a new sample.

Conventionally, when a system receives a new sample, the new sample will be used to update a trained classification model. However, as mentioned above, using a noise sample with a noise label to train a model will lead to the degradation of the model. Therefore, it is expected to accurately identify a noise sample, so as to avoid meaningless operation related to the noise sample.

An embodiment of the present disclosure provides a solution for evaluating samples at an edge device to solve one or more of the above problems and other potential problems. In this solution, at the edge device, a received sample and its label are evaluated, so as to determine whether the sample conforms to a distribution of a class indicated by its label, thus determining whether the sample belongs to its class. In this way, a noise sample with a wrong label can be identified, thus avoiding the degradation of a model caused when updating the model, so that the system is more robust.

It should be understood that the classification model described here is only an example machine learning model and not intended to limit the scope of the present disclosure. Any specific machine learning model can be selected according to a specific application scenario.

Example embodiments of the present disclosure will be described in detail below with reference to FIG. 2 to FIG. 5.

Figure 2:
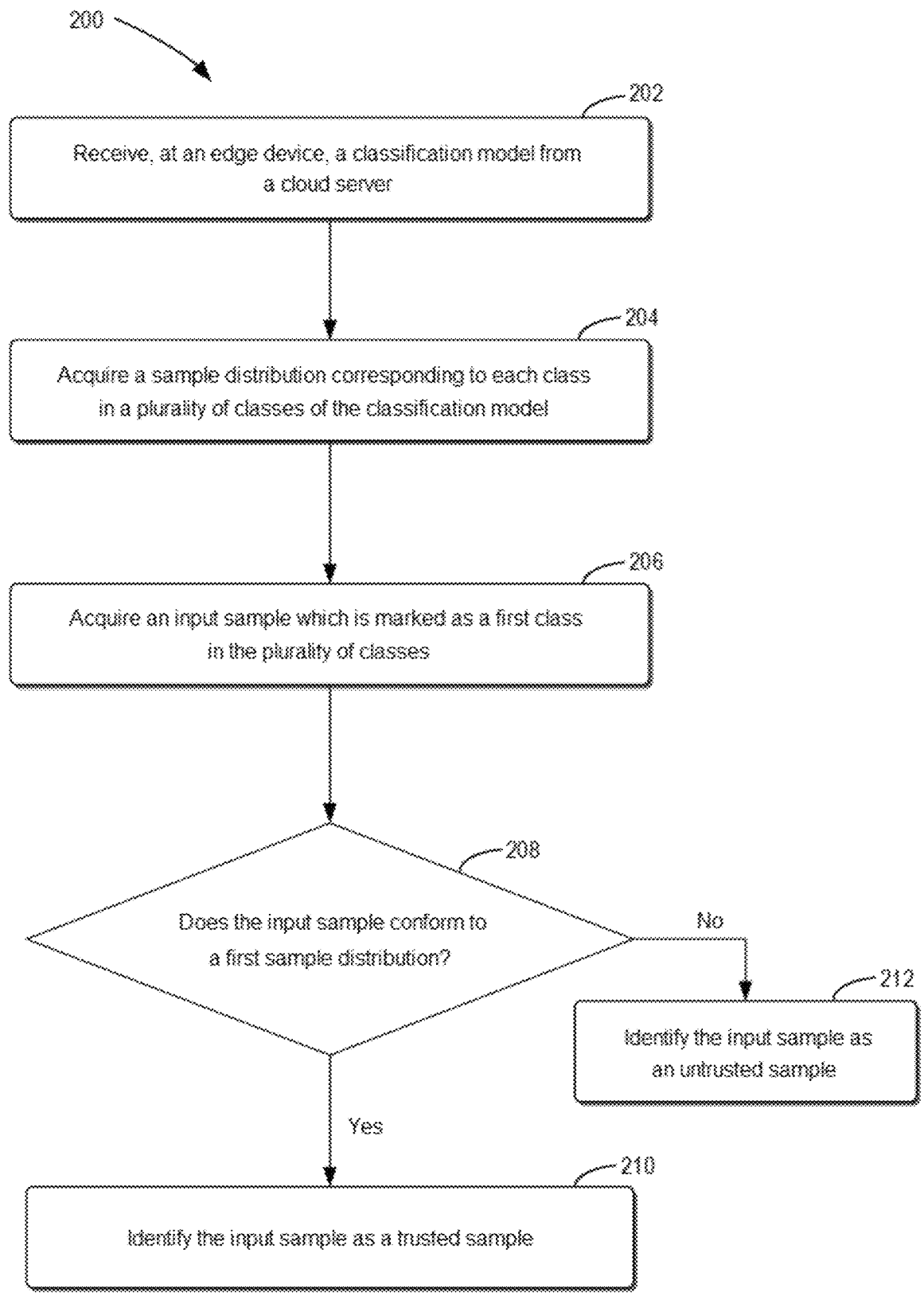
FIG. 2 shows a flow chart of an example method for evaluating samples according to the present disclosure.

FIG. 2 illustrates a flow chart of example method 200 for model training according to the present disclosure. Method 200 can be implemented, for example, at edge device 120 as shown in FIG. 1. It should be understood that method 200 may also include additional actions not shown and/or may omit actions shown, and the scope of the present disclosure is not limited in this regard. Method 200 is described in detail below with reference to FIGS. 1, 2, and 4.

As shown in FIG. 2, at 202, edge device 120 receives a classification model from cloud server 110. In some embodiments, the classification model is obtained by training at cloud server 110 on the basis of initial samples.

At 204, edge device 120 acquires a sample distribution corresponding to each class in a plurality of classes of the classification model. In some embodiments, the sample distribution may be a distribution of samples for feature expressions of their classes. In this embodiment, the samples can be characterized to extract the feature expressions, such as feature vectors. Then, the feature expressions are fitted to obtain a distribution expression that satisfies a certain distribution rule (such as Gaussian distribution and a Gaussian mixture model), for example, a corresponding distribution function. In some embodiments, the distribution expression may be determined at cloud server 110. The distribution expression will be described below in detail with reference to FIG. 4.

Figure 4:
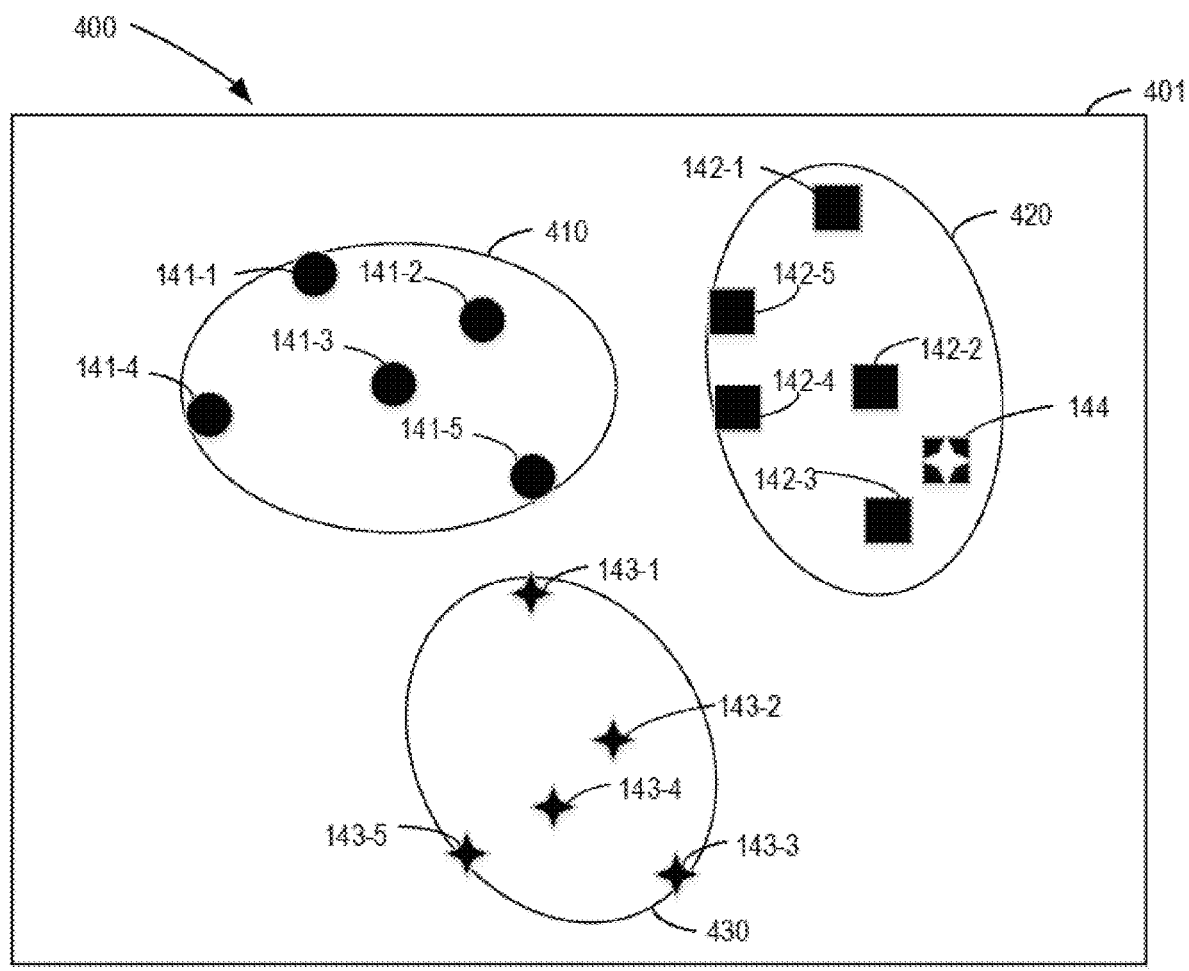
FIG. 4 shows a schematic diagram of an example distribution of various samples according to the present disclosure.

FIG. 4 shows a schematic diagram of example distribution 400 of various samples according to the present disclosure. Distribution 400 is, for example, a sample distribution of three classes of traffic signs in FIG. 1. The samples shown in FIG. 4 are, for example, feature vectors obtained by characterizing images of respective traffic signs, and the feature vectors are converted into a specific feature space through space conversion so as to satisfy a specific distribution mode. For example, in feature space 401 shown in FIG. 4, first feature points 141-1, 141-2, 141-3, 141-4, and 141-5 corresponding to samples of traffic light sign 141, second feature points 142-1, 142-2, 142-3, 142-4, and 142-5 corresponding to samples of no-right-turn sign 142, and third feature points 143-1, 143-2, 143-3, 143-4, and 143-5 corresponding to samples of no-car-passing sign 143 respectively satisfy first Gaussian distribution 410, second Gaussian distribution 420, and third Gaussian distribution 430. In order to visualize the feature vectors, the feature vectors can be subjected to dimension reduction processing. As shown in FIG. 4, in feature space 401, the Gaussian distribution is overall elliptical.

Returning to FIG. 2, at 206, edge device 120 acquires an input sample which is marked as a first class in the plurality of classes. For example, edge device 120 can receive, from terminal device 130, a sample acquired by terminal device 130.

At 208, edge device 120 determines whether the input sample conforms to a first sample distribution corresponding to the first class. In some embodiments, edge device 120 can determine whether the input sample conforms to the first sample distribution by calculating whether the feature expression of the input sample conforms to the distribution expression of the first sample distribution. How to determine whether the input sample conforms to the first sample distribution is described below by referring to FIG. 4 again.

As shown in FIG. 4, since the feature point corresponding to the sample satisfies the Gaussian distribution in feature space 401, the samples with the same class may be fitted to determine a mathematical expression of the corresponding Gaussian distribution. For example, a standard deviation and a mean can be obtained, so that a distribution form of the samples can be accurately determined. When the input sample is noise sample 144 acquired from terminal device 130-1 of FIG. 1, according to the label of noise sample 144, the noise sample is identified as a "four-angle star" corresponding to no-car-passing sign 143. However, it can be clearly seen from FIG. 4 that noise sample 144 conforms to second Gaussian distribution 420 corresponding to no-right-turn sign 142. Therefore, it can be determined that noise sample 144 should be no-right-turn sign 142, so that it can be determined that noise sample 144 is wrongly marked.

In some embodiments, edge device 120 may determine an input sample distribution of the input sample. In this embodiment, edge device 120 can determine the input sample distribution on the basis of the input sample and other samples that are marked as the same class. For example, the edge device can acquire the input sample distribution by fitting the input sample and other samples of the same class on the basis of a certain distribution rule. Other samples of the same class can be acquired recently from terminal device 130 or may be acquired previously from cloud server 110. Then, edge device 120 determines a similarity between the input sample distribution and a first sample distribution. For example, a measure of the similarity is determined by calculating a KL divergence between the input sample distribution and the first sample distribution. Finally, edge device 120 determines, on the basis of the similarity, whether the input sample conforms to the first sample distribution. For example, when the similarity is greater than a predetermined threshold, it is determined that the input sample conforms to the first sample distribution. When the similarity is less than the predetermined threshold, it is determined that the input sample does not conform to the first sample distribution.

If edge device 120 determines that the input sample conforms to the first sample distribution, method 200 proceeds to 210. At 210, edge device 120 identifies the input sample as a trusted sample, i.e., the trusted sample indicates that the input sample is correctly marked.

In this way, samples that are correctly marked with classes can be identified, so that the correctly marked samples can be used for subsequent processing, the quality of the samples is guaranteed, and the robustness of the entire system is improved.

In some embodiments, edge device 120 may send the trusted sample to cloud server 110. After receiving the trusted sample, cloud server 110 can update the classification model by using the trusted sample and the initial samples, and then send the updated classification model to edge device 120. In this way, the quality of the updated classification model is guaranteed.

In some embodiments, edge device 120 can receive a distilled sample from cloud server 110. The distilled sample is obtained by distilling initial samples at the cloud server, and the classification model is trained on the basis of the initial samples. When edge device 120 receives an input sample and determines it as a trusted sample, edge device 120 retrains the classification model using the distilled sample and the trusted sample. In this way, by using a small number of distilled samples and trusted samples to update a model, the efficiency of updating the model can be further improved while ensuring the robustness of the system.

In some embodiments, edge device 120 may store the distilled sample permanently, and send, when it is determined that the initial samples at cloud server 110 are no longer available due to loss, machine failure, or the like, the distilled sample to cloud server 110. Thus, cloud server 110 can use the distilled sample to restore the distributions of the samples of all the classes, and then sample from the corresponding distributions in a certain manner to reconstruct an initial sample set. In this way, the security of the data can be guaranteed without occupying too many resources.

On the contrary, if the input sample does not conform to the first sample distribution, method 200 proceeds to 212. At 212, edge device 120 identifies the input sample as an untrusted sample. In some embodiments, edge device 120 may send the untrusted sample to the cloud server. Although the untrusted sample has a wrong label, it may contain other useful information. Therefore, the untrusted sample is sent to the cloud server for alignment processing at the cloud server. For example, noise label learning is used to mark the untrusted sample with a class, i.e., assigning a prepared label. Afterwards, the classification model is updated with samples with accurate labels. In this way, all the samples can be utilized to the maximum extent, so that the trained model is more comprehensive.

After the input sample is determined as a trusted sample, the trusted sample can be further evaluated to determine whether it contains useful information for training the model. A further evaluation of the trusted sample is described in detail below with reference to FIG. 3.

Figure 3:
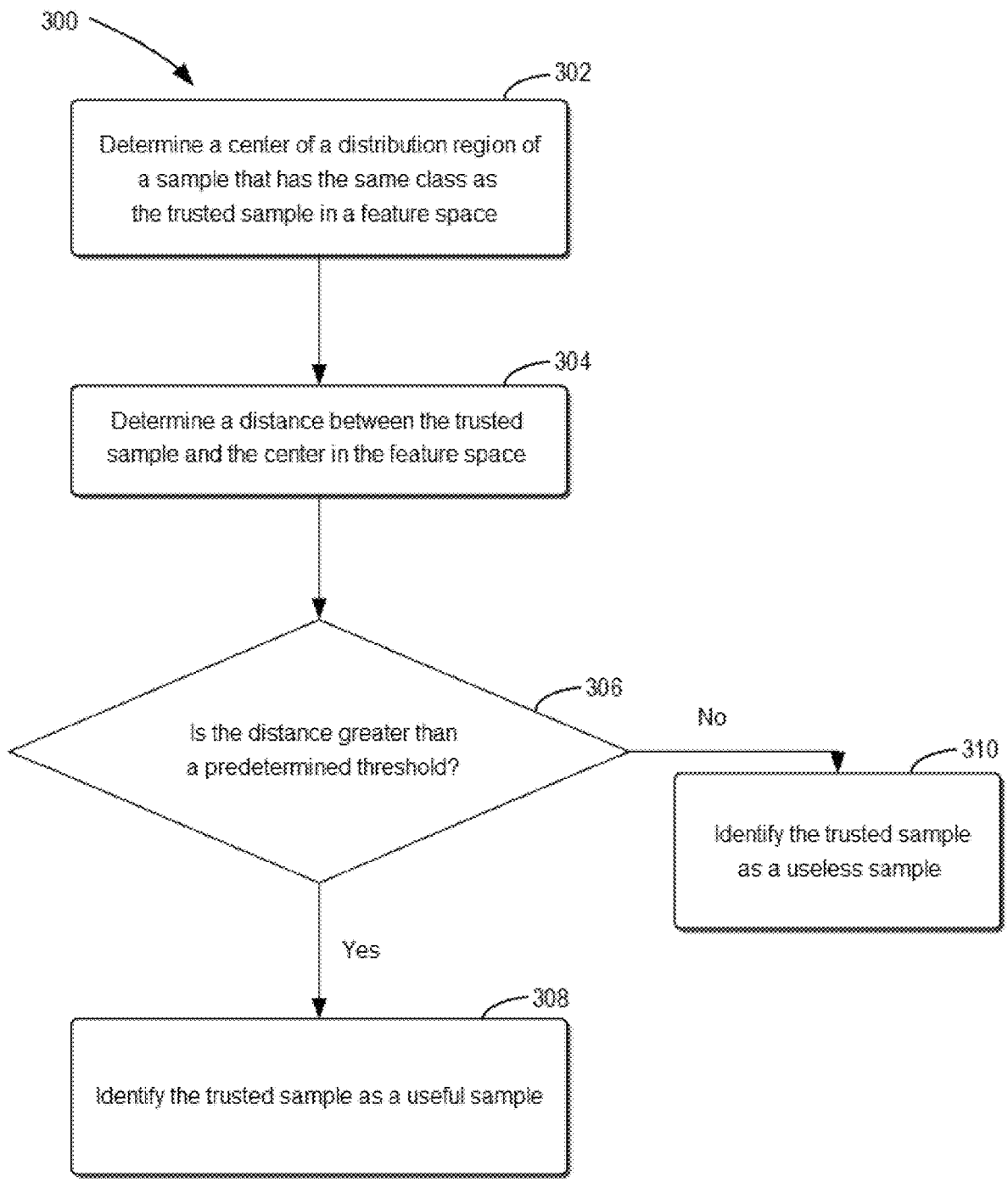
FIG. 3 shows a schematic diagram of an example method for further evaluating samples according to the present disclosure.

FIG. 3 shows a schematic diagram of example method 300 for further evaluating useful samples according to the present disclosure. Method 300 may be regarded as a continuation of method 200. Method 300 can be implemented, for example, at edge device 120 as shown in FIG.

1. It should be understood that method 300 may also include additional actions not shown and/or may omit actions shown, and the scope of the present disclosure is not limited in this regard. Method 300 is described in detail below with reference to FIGS. 1, 3, and 4.

At 302, edge device 120 determines a center of a distribution region of a sample that has the same class as the trusted sample in a feature space, such as centers of the ellipses of first Gaussian distribution 410, second Gaussian distribution 420, and third Gaussian distribution 430 in FIG. 4.

At 304, edge device 120 determines a distance between the trusted sample and the center in the feature space, for example, a distance from a feature point in FIG. 4 to the center of the ellipse.

At 306, edge device 120 determines whether the determined distance is greater than a predetermined threshold. If the distance is greater than the predetermined threshold, method 300 proceeds to 308. At 308, edge device 120 identifies the trusted sample as a useful sample. On the contrary, if the distance is not greater than the predetermined threshold, method 300 proceeds to 310. At 310, edge device 120 identifies the trusted sample as a useless sample. It should be understood that when the distance from a feature point corresponding to a sample to the center of the feature distribution is small, such as first feature point 141-3, second feature point 142-2, and third feature point 143-4 in FIG. 4, the corresponding feature point cannot reflect a boundary condition of the distribution and thus carries relatively less information associated with the distribution. When the distance between a feature point corresponding to a sample and the center of the feature distribution is large, as is the case for each of first feature points 141-1, 141-4, and 141-5, second feature points 142-4 and 142-5, and third feature points 143-1, 143-3, and 143-5 in FIG. 4, the corresponding feature point is located near the boundary of its distribution and can well reflect that distribution, so it carries relatively more information related to the distribution and is more useful to the training and update of the model.

In this way, further screening from the trusted samples can be performed to avoid subsequent operations on useless samples, thereby reducing the waste of computing resources. Since only useful samples are transmitted to cloud server 110, the data transmission bandwidth is reduced.

Figure 5:
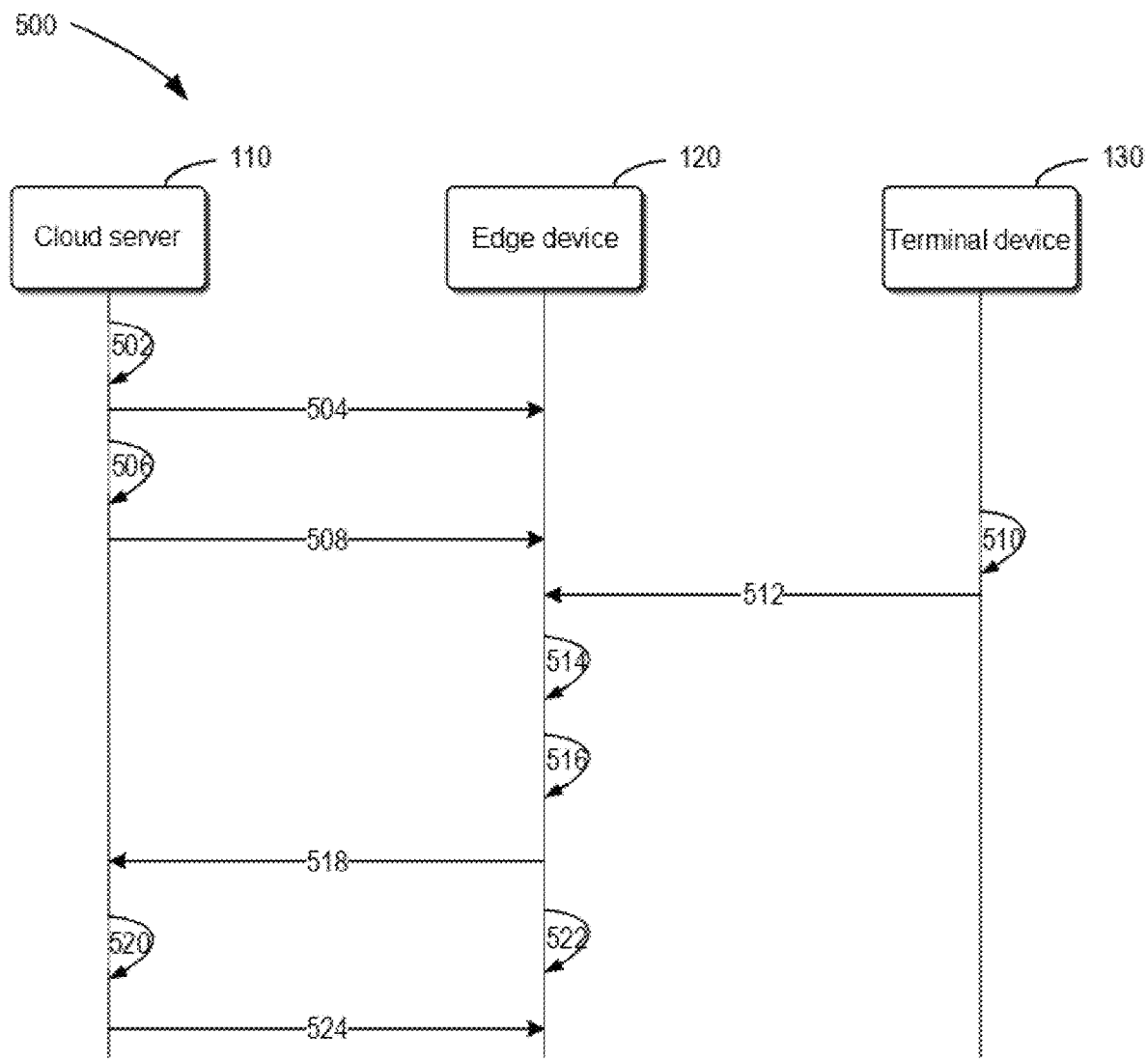
FIG. 5 shows a schematic diagram of an example process of updating a model according to the present disclosure.

FIG. 5 shows a schematic diagram of example process 500 of updating a model according to the present disclosure. Process 500 may be regarded as a specific implementation of method 200. It should be understood that process 500 may also include additional actions not shown and/or may omit actions shown, and the scope of the present disclosure is not limited in this regard. Process 500 is described in detail below with reference to FIGS. 1 and 5.

As shown in FIG. 5, process 500 involves cloud server 110, edge device 120, and terminal device 130 of FIG. 1. At 502, cloud server 110 uses the initial sample set to train the classification model. Cloud server 110, for example, uses a sample set including various signs to train a classification model used for classifying signs.

At 504, cloud server 110 sends the trained classification model to edge device 120.

At 506, cloud server 110 distills the initial sample set using a data distillation algorithm to obtain distilled samples. The number of the distilled samples is much less than the number of initial samples, but their training effects are similar.

At 508, cloud server 110 sends the extracted distilled samples to edge device 120. At this point, initial deployment has been completed, and terminal device 130 can utilize edge device 120 to classify detected signs.

At 510, terminal device 130 detects a new sample (also referred to as an input sample). Then at 512, terminal device 130 sends the new sample to edge device 120.

At 514, edge device 120 determines, through method 200 for example, whether the new sample is a trusted sample, and identifies the sample.

At 516, edge device 120 also determines, through method 300 for example, whether the trusted sample is a useful sample, and identifies the sample.

At 518, edge device 120 sends the useful sample to cloud server 110.

At 520, cloud server 110 retrains the classification model by using the useful sample and the initial samples.

At 522, edge device 120 retrains the classification model by using the distilled sample and the new sample. Thus, the update of the model at the edge device is completed.

At 524, cloud server 110 sends the updated classification model to edge device 120. Thus, edge device 120 obtains a more comprehensive classification model.

In this way, efficient and robust update of the model is achieved through the cooperation between the three layers of devices, and the data security of the system is improved.

Figure 6:
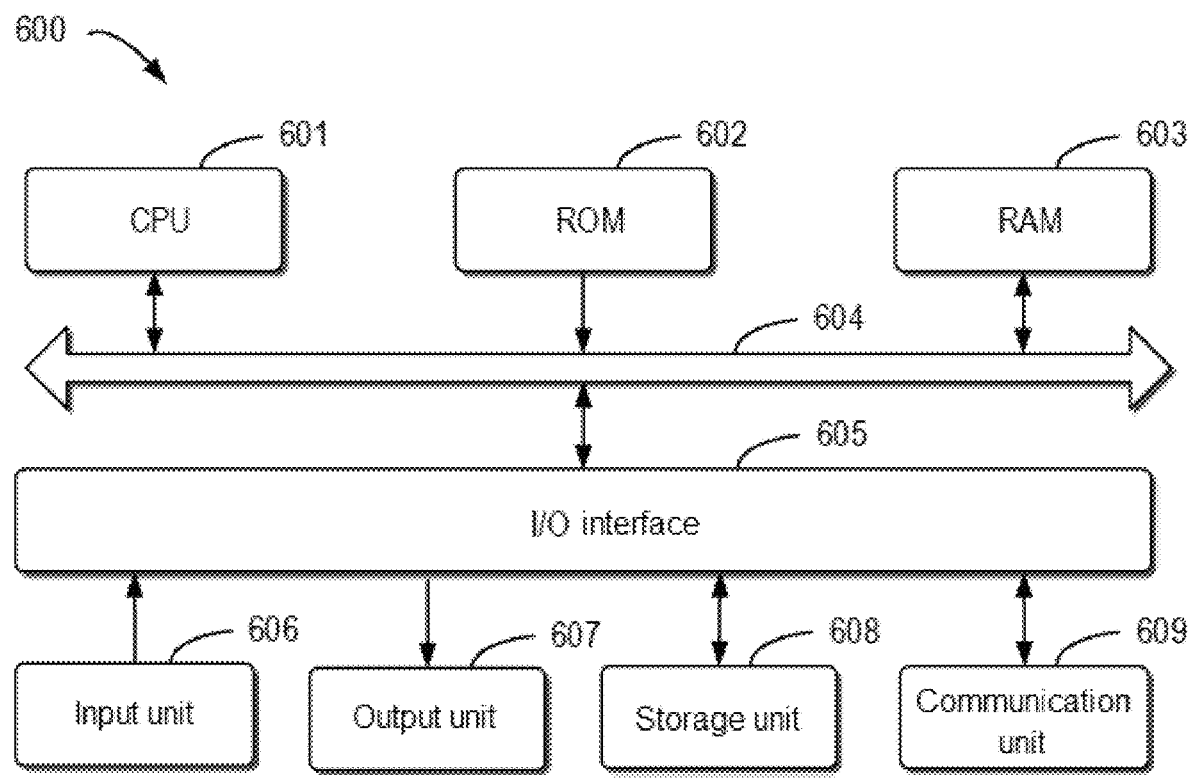
FIG. 6 is a block diagram of an example device that can be used to implement embodiments of the present disclosure.

FIG. 6 illustrates a schematic block diagram of example device 600 that can be used to implement embodiments of the present disclosure. As shown in FIG. 6, device 600 includes central processing unit (CPU) 601 that may perform various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

The various processes and processing described above, such as method 200 and method 300, may be performed by CPU 601. For example, in some embodiments, methods 200 and 300 may be implemented as a computer software program that is tangibly included in a machine-readable medium such as storage unit 608. In some embodiments, part of or all the computer program may be loaded and/or installed onto device 600 via ROM 602 and/or communication unit 609. When the computer program is loaded to RAM 603 and executed by CPU 601, one or more actions of methods 200 and 300 described above may be executed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented by using a combination of special hardware and computer instructions.

Example embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms used herein is intended to best explain the principles and practical applications of the various embodiments or the improvements to technologies on the market, so as to enable persons of ordinary skill in the art to understand the embodiments disclosed herein.

What is claimed is:

1. A method of evaluating samples, comprising:
receiving, at an edge device, a classification model from a cloud server, wherein the classification model is trained at the cloud server using a first sample set comprising a first number of samples;
receiving, at the edge device from the cloud server, a second sample set comprising a second number of samples less than the first number of samples, wherein the second sample set comprises a plurality of distilled samples obtained from the first sample set by a data distillation operation performed at the cloud server;
acquiring, at the edge device, a sample distribution corresponding to each class in a plurality of classes of the classification model;
acquiring, at the edge device from a terminal device having at least one Internet-of-Things (IoT) sensor, an input sample which is marked as a first class in the plurality of classes, wherein the input sample is captured by the IoT sensor of the terminal device and is marked with a label indicating the first class;
determining, at the edge device, whether the input sample conforms to a first sample distribution corresponding to the first class;
identifying, at the edge device and in response to the input sample conforming to the first sample distribution, the input sample as a trusted sample, the trusted sample indicating that the input sample is correctly marked with the label indicating the first class; and
retraining the classification model, at the edge device, utilizing the distilled samples and the trusted sample.

2. The method according to claim 1, wherein the determining whether the input sample conforms to a first sample distribution corresponding to the first class comprises:
determining an input sample distribution of the input sample;
determining a similarity between the input sample distribution and the first sample distribution; and
determining, on the basis of the similarity, whether the input sample conforms to the first sample distribution.

3. The method according to claim 1, further comprising:
receiving, at the edge device, a given one of the distilled samples from the cloud server, the given distilled sample being obtained by distilling initial samples at the cloud server, and the classification model being trained on the basis of the initial samples; and
retraining, by the edge device, the classification model by using the given distilled sample and the trusted sample.

4. The method according to claim 3, further comprising:
sending, in response to determining that at least one of the initial samples at the cloud server is lost, the given distilled sample to the cloud server.

5. The method according to claim 1, further comprising:
sending the trusted sample from the edge device to the cloud server; and
receiving an updated classification model from the cloud server, the updated classification model being retrained by the cloud server on the basis of initial samples and the trusted sample.

6. The method according to claim 5, further comprising:
identifying, in response to the input sample not conforming to the first sample distribution, the input sample as an untrusted sample, the untrusted sample indicating that the input sample is not correctly marked;
sending the untrusted sample to the cloud server; and
receiving an updated classification model from the cloud server, the updated classification model being retrained on the basis of the untrusted sample, the trusted sample, and the initial samples, and the untrusted sample being correctly marked using a self-learning model before the retraining.

7. The method according to claim 1, further comprising:
determining a center of a distribution region of a sample that has the same class as the trusted sample in a feature space;
determining a distance between the trusted sample and the center in the feature space; and
identifying, in response to the distance being greater than a predetermined threshold, the trusted sample as a useful sample.

8. The method according to claim 7, further comprising:
sending the useful sample to the cloud server; and
receiving an updated classification model from the cloud server, the updated classification model being trained on the basis of the useful sample and initial samples.

9. An electronic device, comprising:
at least one processor; and
memory coupled to the at least one processor, wherein the memory has instructions stored therein, and the instructions, when executed by the at least one processor, cause the electronic device to execute actions comprising:
receiving, at an edge device, a classification model from a cloud server, wherein the classification model is trained at the cloud server using a first sample set comprising a first number of samples;
receiving, at the edge device from the cloud server, a second sample set comprising a second number of samples less than the first number of samples, wherein the second sample set comprises a plurality of distilled samples obtained from the first sample set by a data distillation operation performed at the cloud server;
acquiring, at the edge device, a sample distribution corresponding to each class in a plurality of classes of the classification model;
acquiring, at the edge device from a terminal device having at least one Internet-of-Things (IoT) sensor, an input sample which is marked as a first class in the plurality of classes, wherein the input sample is captured by the IoT sensor of the terminal device and is marked with a label indicating the first class;
determining, at the edge device, whether the input sample conforms to a first sample distribution corresponding to the first class;
identifying, at the edge device and in response to the input sample conforming to the first sample distribution, the input sample as a trusted sample, the trusted sample indicating that the input sample is correctly marked with the label indicating the first class; and
retraining the classification model, at the edge device, utilizing the distilled samples and the trusted sample.

10. The electronic device according to claim 9, wherein the determining whether the input sample conforms to a first sample distribution corresponding to the first class comprises:
determining an input sample distribution of the input sample;
determining a similarity between the input sample distribution and the first sample distribution; and
determining, on the basis of the similarity, whether the input sample conforms to the first sample distribution.

11. The electronic device according to claim 9, further comprising:

receiving, at the edge device, a given one of the distilled samples from the cloud server, the given distilled sample being obtained by distilling initial samples at the cloud server, and the classification model being trained on the basis of the initial samples; and retraining, by the edge device, the classification model by using the given distilled sample and the trusted sample.

12. The electronic device according to claim 11, further comprising:

sending, in response to determining that at least one of the initial samples at the cloud server is lost, the given distilled sample to the cloud server.

13. The electronic device according to claim 9, further comprising:

sending the trusted sample from the edge device to the cloud server; and receiving an updated classification model from the cloud server, the updated classification model being retrained by the cloud server on the basis of initial samples and the trusted sample.

14. The electronic device according to claim 13, further comprising:

identifying, in response to the input sample not conforming to the first sample distribution, the input sample as an untrusted sample, the untrusted sample indicating that the input sample is not correctly marked; and sending the untrusted sample to the cloud server; and receiving an updated classification model from the cloud server, the updated classification model being retrained on the basis of the untrusted sample, the trusted sample, and the initial samples, and the untrusted sample being correctly marked using a self-learning model before the retraining.

15. The electronic device according to claim 9, further comprising:

determining a center of a distribution region of a sample that has the same class as the trusted sample in a feature space;

determining a distance between the trusted sample and the center in the feature space; and identifying, in response to the distance being greater than a predetermined threshold, the trusted sample as a useful sample.

16. The electronic device according to claim 15, further comprising:

sending the useful sample to the cloud server; and receiving an updated classification model from the cloud server, the updated classification model being trained on the basis of the useful sample and initial samples.

17. A computer program product that is tangibly stored on a non-transitory computer-readable medium and comprises machine-executable instructions, wherein the machine-executable instructions, when executed by a machine, cause the machine to perform actions comprising:

receiving, at an edge device, a classification model from a cloud server, wherein the classification model is trained at the cloud server using a first sample set comprising a first number of samples;

receiving, at the edge device from the cloud server, a second sample set comprising a second number of samples less than the first number of samples, wherein the second sample set comprises a plurality of distilled samples obtained from the first sample set by a data distillation operation performed at the cloud server;

acquiring, at the edge device, a sample distribution corresponding to each class in a plurality of classes of the classification model;

acquiring, at the edge device from a terminal device having at least one Internet-of-Things (IoT) sensor, an input sample which is marked as a first class in the plurality of classes, wherein the input sample is captured by the IoT sensor of the terminal device and is marked with a label indicating the first class;

determining, at the edge device, whether the input sample conforms to a first sample distribution corresponding to the first class;

identifying, at the edge device and in response to the input sample conforming to the first sample distribution, the input sample as a trusted sample, the trusted sample indicating that the input sample is correctly marked with the label indicating the first class; and retraining the classification model, at the edge device, utilizing the distilled samples and the trusted sample.

18. The computer program product according to claim 17, wherein the determining whether the input sample conforms to a first sample distribution corresponding to the first class comprises:

determining an input sample distribution of the input sample;

determining a similarity between the input sample distribution and the first sample distribution; and determining, on the basis of the similarity, whether the input sample conforms to the first sample distribution.

19. The computer program product according to claim 17, further comprising:

receiving, at the edge device, a given one of the distilled samples from the cloud server, the given distilled sample being obtained by distilling initial samples at the cloud server, and the classification model being trained on the basis of the initial samples; and retraining, by the edge device, the classification model by using the given distilled sample and the trusted sample.

20. The computer program product according to claim 19, further comprising:

sending, in response to determining that at least one of the initial samples at the cloud server is lost, the given distilled sample to the cloud server.

* * * * *